United States Patent
Pfleger de Aguiar et al.

(10) Patent No.: US 10,331,429 B2
(45) Date of Patent: Jun. 25, 2019

(54) PATCH MANAGEMENT FOR INDUSTRIAL CONTROL SYSTEMS

(71) Applicant: Siemens Aktiengesellschaft, Munich (DE)

(72) Inventors: Leandro Pfleger de Aguiar, Robbinsville, NJ (US); Alberto Avritzer, Mountainside, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 247 days.

(21) Appl. No.: 15/237,872

(22) Filed: Aug. 16, 2016

(65) Prior Publication Data

US 2018/0136921 A1 May 17, 2018

Related U.S. Application Data

(60) Provisional application No. 62/214,236, filed on Sep. 4, 2015.

(51) Int. Cl.
| | |
|---|---|
| G06F 8/65 | (2018.01) |
| G06N 7/00 | (2006.01) |
| G06F 21/57 | (2013.01) |
| H04L 29/06 | (2006.01) |
| G06Q 10/06 | (2012.01) |
| G06Q 10/00 | (2012.01) |
| G05B 19/418 | (2006.01) |

(52) U.S. Cl.
CPC .............. *G06F 8/65* (2013.01); *G06F 21/577* (2013.01); *G06N 7/005* (2013.01); *G06Q 10/06* (2013.01); *G06Q 10/20* (2013.01); *H04L 63/1433* (2013.01); *G05B 19/4185* (2013.01); *G06F 2221/033* (2013.01); *Y02P 90/86* (2015.11)

(58) Field of Classification Search
CPC .... G06F 8/65; G06F 21/577; G06F 2221/033; G06N 7/005; H04L 63/1433; G05B 19/4185
USPC ........................................................ 717/168
See application file for complete search history.

(56) References Cited

U.S. PATENT DOCUMENTS

| | | | | |
|---|---|---|---|---|
| 7,284,274 | B1 * | 10/2007 | Walls | G06F 8/70 726/25 |
| 8,423,833 | B2 * | 4/2013 | Avritzer | G06F 11/1438 714/25 |
| 8,713,555 | B1 * | 4/2014 | Feeser | G06F 8/68 717/168 |

(Continued)

OTHER PUBLICATIONS

Abraham, Subil et al., Applicant Submitted Prior Art, 2015.*

(Continued)

*Primary Examiner* — Duy Khuong T Nguyen
*Assistant Examiner* — Theodore E Hebert

(57) ABSTRACT

For patch management of an industrial control system, predicted temporal evolution of risk due to vulnerability is provided to industrial control system operators to help schedule patching. A Markov chain representing the temporal evolution uses asset (e.g., industrial control system component) specific information to determine risk over time. This risk information may be used to prioritize and/or schedule patching. The operator is provided more information to help manage patching of the industrial control system, allowing better balancing of risk with manufacturing burden.

11 Claims, 5 Drawing Sheets

(56) References Cited

U.S. PATENT DOCUMENTS

| | | | | |
|---|---|---|---|---|
| 2004/0210653 | A1* | 10/2004 | Kanoor | G06F 8/65 709/223 |
| 2013/0101320 | A1* | 4/2013 | Okamoto | G03G 15/09 399/274 |
| 2014/0130033 | A1* | 5/2014 | Alls | G06F 8/65 717/172 |
| 2014/0137257 | A1* | 5/2014 | Martinez | H04L 63/1433 726/25 |
| 2015/0007160 | A1* | 1/2015 | Traill | G06F 8/65 717/171 |
| 2018/0136921 | A1* | 5/2018 | Pfleger de Aguiar | G06F 8/65 |

OTHER PUBLICATIONS

Quanyan Zhu et al; "A hierarchical security architecture for smart grid"; Smart Grid Communications and Networking; 2012; Cambridge University Press; pp. 413-438; ISBN: 978-1-139-01346-8; DOI: 10.1017/CB09781139013468.019; XP055307544.

European Search Report dated Oct. 12, 2016; Application No. 16185736.2; Filing Date: Aug. 25, 2016; 9-pages.

Abraham, Subil, and Suku Nair. "A Predictive Framework for Cyber Security Analytics using Attack Graphs." arXiv preprint arXiv:1502.01240 (2015).

Beres, Yolanta, et al. "Analysing the performance of security solutions to reduce vulnerability exposure window." Computer Security Applications Conference, 2008. ACSAC 2008. Annual. IEEE, 2008.

Debabrata Dey, Atanu Lahiri, Guoying Zhang (2015) Optimal Policies for Security Patch Management. Informs Journal on Computing 27(3):462-477. Oct. 6, 2015.

Durumeric, Zakir, et al. "The matter of heartbleed." Proceedings of the 2014 Conference on Internet Measurement Conference. ACM, 2014.

Frei, Stefan, et al. "Large-scale vulnerability analysis." Proceedings of the 2006 SIGCOMM workshop on Large-scale attack defense. ACM, 2006.

Frei, Stefan. Security Econometrics the Dynamics of (In) Security. Diss. ETH Zurich, 2009.

Huang, Chien-Cheng, et al. "Software Vulnerability Patch Management with Semi-Markov Decision Process." Appl. Math 7.6 (2013): 2467-2476.

Kandek, Wolfgang. "The laws of vulnerabilities 2.0." BlackHat, Las Vegas, NV, USA (2009).

Shahzad, Muhammad, Muhammad Zubair Shafiq, and Alex X. Liu. "A large scale exploratory analysis of software vulnerability life cycles." Proceedings of the 34th International Conference on Software Engineering. IEEE Press, 2012.

Jemura, Toshikazu, and Tadashi Dohi. "Optimal security patch management policies maximizing system availability." Journal of Communications 5.1 (2010): 71-80.

Zaninetti, Lorenzo, and Mario Ferraro. "On the truncated Pareto distribution with applications." Open Physics 6.1 (2008): 1-6.

Schneier, Bruce. Economics of Information Security and Privacy III. Springer, 2013.

* cited by examiner

US 10,331,429 B2

PATCH MANAGEMENT FOR INDUSTRIAL CONTROL SYSTEMS

RELATED APPLICATIONS

The present patent document claims the benefit of the filing date under 35 U.S.C. § 119(e) of Provisional U.S. Patent Application Ser. No. 62/214,236, filed Sep. 4, 2015, which is hereby incorporated by reference.

BACKGROUND

The present embodiments relate to managing patching in industrial control systems. In particular, timing and/or priority of patching software vulnerabilities in the industrial control system is provided.

Unpatched published vulnerabilities represent the most likely attack vector for software. Industrial control systems pose an unsolved problem to the security community. The manufacturing sector, for instance, takes an average of 51 days from disclosure to install a patch. There are a number of reasons why patching industrial control system components is typically not performed immediately after the patch disclosure or vulnerability disclosure. Fixes incorporated into the patches have to be exhaustively tested as a general rule, both by the vendor and by the asset owner, prior to patching to avoid the shut-down costs associated with an improper fix to control systems. In addition, some patches require a complete system reboot, which might have to be synchronized with plant maintenance schedules where a production outage is already expected. Given the desire to greatly limit downtime in industrial manufacturing, it is crucial to understand which components and vulnerabilities deserve the most attention.

Patching models may be useful for government agencies responsible for providing support during massive attack campaigns. Having information about industrial control components where the attack is more likely may guide use of limited resources and expertise.

BRIEF SUMMARY

By way of introduction, the preferred embodiments described below include methods, systems, and computer readable media for patch management of an industrial control system. Predicted temporal evolution of risk due to vulnerabilities is provided to industrial control system maintenance operators to help prioritize and schedule patching. A Markov chain representing the temporal evolution uses asset (e.g., industrial control system component) specific information to determine risk over time. This risk information may be used to prioritize and/or schedule patching. The operator is provided more information to help manage patching of the industrial control system, allowing better balancing of risk with manufacturing burden.

In a first aspect, a method is provided for patch management of industrial control systems. A vulnerability ranking for vulnerability of an industrial control system and a patch for the vulnerability are acquired. A temporal evolution of the vulnerability ranking is modeled with a Markov chain. The temporal evolution includes at least three states for the vulnerability and predicted times of transition between the states. A first one of the at least three states is determined for the industrial control system given the vulnerability. A first one of the predicted times for transition from the first state to a second one of the at least three states is also determined. The first state and the first predicted time to transition to the second state for the industrial control system are transmitted.

In a second aspect, a method is provided for patch management of industrial control systems. Criticality rankings are received for devices of an industrial control system. Evolutions of risk to the devices over time due to vulnerabilities are predicted. The risk is a function of the criticality ranking. The pairings are ranked as a function of a time to move between states of the risk. The ranking is output as a schedule priority for patching the vulnerabilities.

In a third aspect, a system is provided for patch management of industrial control systems. An interface connects with an industrial control system. The interface is configured to receive topology information for the industrial control system and importance of devices in the industrial control system. The interface is also configured to receive scoring for a vulnerability of a first device of the industrial control system. A server is configured to parameterize risks to an attack in different states of vulnerability of the first device. The risks are parameterized as a function of the topology information for the first device, importance of the first device, the scoring, and an average time to weaponization. The interface is configured to communicate information that is a function of the parameterization of the risks to the industrial control system.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Patch management is a critical aspect of securing industrial control systems against software attacks. Due to the intrinsic critical nature of industrial control systems, traditional information-technology approaches may not apply in most cases. Additional information about vulnerabilities and risks are to be considered to support patch decisions that minimize risks while maximizing availability of the controlled production processes. As a result, industrial control systems may have a number of unpatched systems for which updates are available.

Risk-aware patch management is provided for industrial control systems. In order to provide better and realistic insights about risks involved in patching or not patching a given industrial control system for each vulnerability disclosure, the resources invested towards patch management are prioritized. Measurements, models, and/or recommendations aid the decision making in cases where the most likely attack vector and time has to be identified. The patching may be more efficiently scheduled based on the provided information.

For patch management, a Markov model is parameterized through measurements. In a first class, the model accounts for the vulnerability lifecycle and captures how risks evolve over time. In a second class, information about the asset owner's patch management practices are incorporated into the model to be able to compute metrics such as the accumulated risk before a patch is typically applied. By assessing the risk as a function of external historical data about vulnerabilities and internal data regarding patch policies, patching strategies may be revised and fine-tuned towards a closed loop between vulnerability rating and patch installation metrics.

Efficient plant risk management requires a careful assessment of continuously changing risk status for each asset in light of newly discovered vulnerabilities. Risk management is also a time-consuming error-prone activity that relies mainly on the capacity of the asset owner to consider a number of internal and external qualitative and quantitative variables to make a decision on whether or not to patch and when to patch. By providing a probabilistic model that considers among other things patch delivery times, expected patch exploitation time, and overall plant risk level, plant maintenance operators may be able to reduce overall risk, while maximizing the efficiency of the patching process. Patch management may be guided in real-time to help in the context of a continuously evolving threat landscape (external view) and the overall plant asset exposure to security attacks (internal view).

Figure 1:
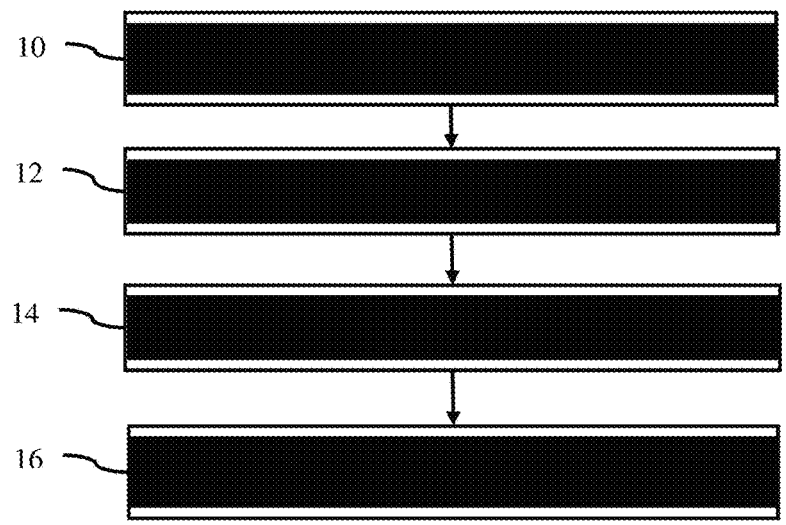
FIG. 1 is a flow chart diagram of one embodiment of a method for patch management of industrial control systems.

FIG. 1 shows one embodiment of a method for patch management of industrial control systems. Information about exploitation of vulnerabilities, exposure of a particular asset, importance of that asset, and risk of exploitation of the vulnerability of the asset are used to model risk over time due to failure to patch. A Markov model is parameterized to assist in determining how long patch installation may be deferred, knowing that on average x amount of time is used to build an exploit for this vulnerability.

Figure 8:
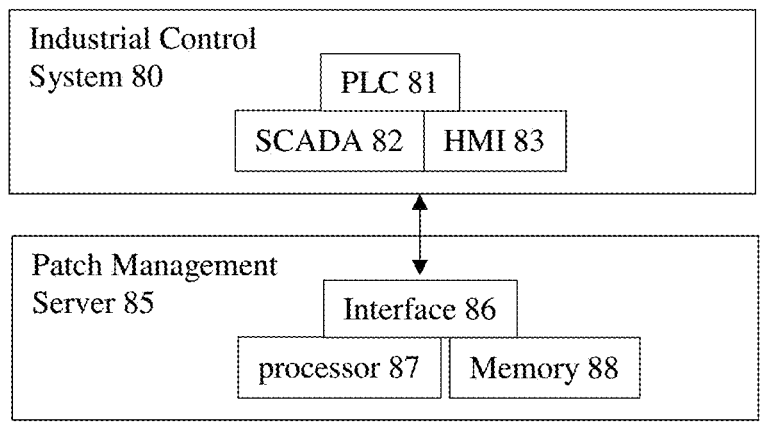
FIG. 8 is a block diagram of one embodiment of a system for patch management of an industrial control system.

The method is implemented by the system of FIG. 8 or another system. For example, an industrial control system provides asset information to a server, such as a cloud server or a server of a government agency, a manager of industrial control systems, or manufacturer of industrial control systems. The server extracts asset characteristics and fits the model to the particular industrial control system and outputs a risk at a given time and an amount of time before increasing to a threshold level of risk, and/or predicted risk and timing. In one embodiment, the server interacts with a legacy industrial control system, such as an industrial control system that has had poor, improper, or no patching. In other embodiments, the industrial control system does not provide asset information, but the server instead extracts asset information from other sources. By assuming an increase in risk over time in the modeling performed by the server, patching may be managed. In other embodiments, a controller or computer of the industrial control system performs the modeling and output.

The acts of FIG. 1 are performed in the order shown (numerically or top to bottom) or in another order. Additional, different, or fewer acts may be performed than shown in FIG. 1. For example, acts 12 and 14 are combined as one act where the state information is determined as part of a fit of the model. As another example, act 14 is not provided, such as where the state and/or time information are used to schedule rather than transmitted for decision by others.

In act 10, an interface, database, or server acquires vulnerability related information for an asset of an industrial control system. The industrial control system is a network or collection of assets (e.g., components) for controlling operation of a manufacturing facility. Products are created by the manufacturing, and the industrial control system controls the creation. The industrial control system may include any number of programmable logic controllers, remote terminal units, supervisory control and acquisition systems, and/or human-machine interface systems. Actuators, machines (e.g., press, mixer, drills, welder, robot, or extruder), environmental, safety, or other industrial devices are controlled for manufacturing in an industrial setting.

The assets use software as part of the control. The software may be vulnerable. A flaw, exposure, or other programming may be exploited to cause the asset to perform in an undesired manner or to provide information to undesired entities. A given asset may have any number of vulnerabilities. The assets of a given industrial control system may have any number of vulnerabilities.

The vulnerabilities may be patched. Since the vulnerability relates to the programming or software, the programming or software may be altered to remove, avoid, or reduce the vulnerability. A patch to change the software or programming may be available from a manufacturer of the asset, a third party, or other source. The vulnerability exists for any amount of time. At some point after the discovery of the vulnerability, a patch is created.

The existence of the vulnerability is acquired without acquiring the actual patch. The acquisition is by pushing, pulling, or access. For example, the Forum of Incident Response and Security Teams (FIRST) indicates the vulnerability. Other organizations, such as the manufacturer of the asset may indicate the vulnerability. In another embodiment, the vulnerability information and the patch are acquired.

Other vulnerability-related information is acquired. The characteristic(s) and/or severity of software vulnerabilities are ranked. For example, a vulnerability ranking for the vulnerability of the industrial control system is acquired. The vulnerability ranking is a score or measure about the vulnerability. The ranking may be over any range. The ranking may be one score or measure, may be one of a plurality of different measures or scores, and/or may be a collection of such measures or scores. In one embodiment, the vulnerability ranking is Common Vulnerability Scoring System (CVSS) information, but other scoring systems may be used. The CVSS information is provided from any source or calculated by the server. The CVSS score is provided using CVSS 2.0 and/or 3.0 (or any future versions of the CVSS or other scoring). In one embodiment, one or more base scores and/or environmental scores are provided as the vulnerability rankings.

For each vulnerability, the vulnerability rankings represent one or more characteristics of the vulnerability. For example, the criticality and exposure are ranked. For criticality, the scope, confidentiality, integrity, and/or availability (i.e., how badly can the vulnerability affect a given system) are identified. For exposure or exploitability, the attack vector, attack complexity, privileges required, and/or user interaction (e.g., how easy to exploit the vulnerability) are identified. Whether the vulnerability is weaponized or other stages or exploitability may be ranked.

Other statistical vulnerability-related information may be acquired for populating the models that determine the state transitions. For example, an average time from disclosure to weaponization of a vulnerability is acquired. Studies or specific information based on release dates of versions of software indicate the time from when a vulnerability is created to when the vulnerability is discovered. An average time from disclosure for all vulnerabilities, vulnerability by type, vulnerability by asset type, or other categorization may be determined. As another example, a time history or exploitation of vulnerabilities is acquired from studies or specific information. The average, median, other probabilistic distribution (e.g., Weibull, exponential, log normal, or combination) or other time history of exploitation of vulnerabilities in general or by categories of vulnerabilities is determined.

In embodiment, a patch installation rate for the asset and/or industrial control system is acquired. The operator of a given industrial control system may tend to delay patching or may be vigilant about patching. The rate (e.g., time from patch availability to patching) for all assets of the industrial control system, by type of asset, or by asset is acquired.

Other vulnerability-related information acquired may include information about the asset that is vulnerable. The software or programming version, hardware specifications, and/or other asset information are acquired. The asset information is acquired from the industrial control system and/or an operator of the industrial control system. The SCADA may collect the data as part of a control process. Alternatively, the data is determined by the operator. A study may be commissioned to determine the data.

In one example, an exposure of the asset is measured. How connected the asset is to the Internet or public networks may indicate the exposure. Exposure is related to the likelihood of being exploited. Wireless verse wired connection may indicate level of exposure. The network topology may indicate the level of exposure of a given asset to likely routes of attack or exploitation of the vulnerability. The level of communication isolation, firewall layers, authorization required for use, data format for communication, and/or other characteristics indicated by the network topology or other source provides a score or level of exposure of the asset. For example, likelihood of exposure may be divided into: likelihood of attack initiation and likelihood of attack success in case the attack is initiated.

In another example of asset information, the criticality of the asset is measured. The importance of the asset (e.g., server verses a workstation) is determined. Criticality is related to the overall impact in case the exploitation occurs. Some systems might be more or less critical than others depending on the level of dependency with the production process. For example, a process historian system is typically less critical, as the process history system serves to aid engineers in optimizing or debugging the process. Such as system in not very critical to on-going manufacture. In contrast, a SCADA system is typically very critical since the SCADA works as the interface for operators to react in case of any deviations in manufacture. Within the control systems network, a PLC may be considered one of the most critical pieces. Sensors and actuators are directly connected and controlled by the PLC. Even in this case, the criticality varies on a case-by-case basis. If the PLC is controlling an actuator in a safety-critical process (e.g. a chemical process where explosions are possible), the asset is critical as compared to a PLC controlling a temperature within a broad range without safety repercussions. Priority for patch installation may be different than in a case where the controlled variable might not generate any catastrophic consequences (e.g. less instrumented production processes such as iron ore mining, for instance). Risk is the product of likelihood (exposure and exploitability) and impact (criticality or consequence). The network topology and/or operator may indicate or rank the criticality of the various assets of the industrial control system.

Other vulnerability-related information about the asset may be acquired. Any one or more scores or rankings of the asset, the vulnerability, or both may be gathered. Any one or more of the types of vulnerability information are gathered. In one embodiment, all of the types of vulnerability information discussed above are gathered.

In act 12, a remote server or the computer of the industrial control system models a temporal evolution of the vulnerability with a Markov chain. In one embodiment, the server is initially loaded with distributions and does not communicate externally other than to provide results. In another embodiment, the models are regularly updated depending on threat intelligence data acquired through communications. The model is loaded for determination in act 14 relative to the specific asset and/or industrial control system.

The vulnerability is modeled as a risk of exploitation over time. Different ranks or states of the vulnerability are modeled. The same or different vulnerability ranking as acquired in act 10 is modeled. The model is of the vulnerability lifecycle. Different risk levels corresponding to the level of vulnerability exploitation are modeled, so the vulnerabilities are decoupled from each other. The model provides an analytic for risk assessment.

Figure 2:
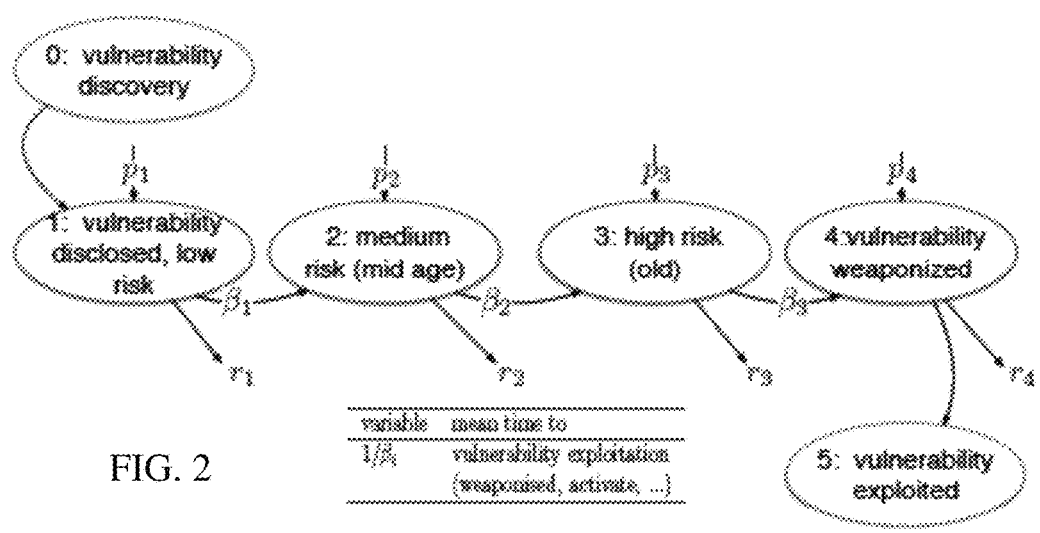
FIG. 2 illustrates an example Markov chain for patch management considering the user's patching behavior.

FIG. 2 shows one embodiment of a Markov chain model with rewards. The temporal evolution includes at least three states for the vulnerability and predicted times of transition between the states. Five states (0-5) are shown, but other numbers of states may be provided. Each state has an associated cost. State 0 corresponds to discovery of the vulnerability and availability of the patch, so represents a starting point or initial state. States 1-4 represent the states where the asset is vulnerable to exploitation because of patch installation deferral. The rewards in states 1-4 are set to 1-4, representing low, medium, high, and weaponized risks of exploitation. State 5 represents the vulnerability being exploited, so has a reward of 5.

Figure 3:
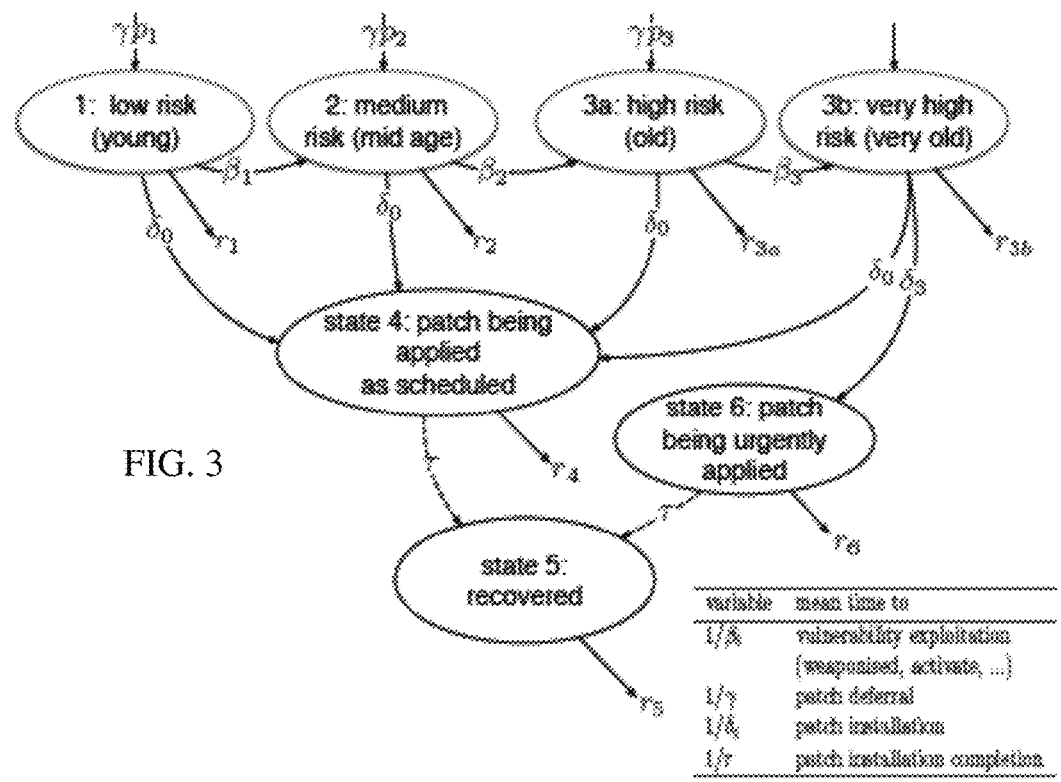
FIG. 3 illustrates another example Markov chain for patch management without the consideration for how much time user's/operators take to patch different types of vulnerabilities.

In other embodiments, states are provided for application of the patch and/or removal of the vulnerability. For example, FIG. 3 shows a Markov chain model with states 1-3 being for vulnerability of exploitation due to deferral of patching, state 4 being for application of the patch, state 5 for removal of the vulnerability, and state 6 for urgent application of the patch. States 4-6 may be assigned 0 risk.

Other states and corresponding Markov chains may be provided. This model may be extended to include additional states representing different exploitation moments in time, depending on available internal and/or external data (e.g. generated from threat intelligence feeds).

Each state is associated with a different time or temporal event for exploitation. For example, a state may be provided for the time between vulnerability discovery and disclosure. As another example, FIG. 2 provides states for weaponization and exploitation, but FIG. 3 does not. Information about weaponization and/or exploitation may not be available, so the model may not include these states.

In one embodiment, the states model the temporal evolution of an exploit code maturity of the Common Vulnerability Scoring System information. The exploit code maturity includes unproven, proof-of-concept, functional, and high levels. A state is provided for each or for any combination of this CVSS temporal score, such as the Markov chain model including just or at least proof-of-concept, functional, and high of the exploit code maturity. Other temporal scores (e.g., remediation level or report confidence) may be modeled. Other states of exploitation than defined in CVSS may be used.

Any reward values may be used for the states. Any valuation or parameterization of the reward or risk for the states may be used. In the examples of FIGS. 2 and 3, integer values are assigned in ascending order. In other examples, CVSS rankings and/or other acquired information is used to parameterize the risk at different system states. The risk may be weighted by distribution probabilities (i.e., chance of being in the given state) and/or amount of time within the deferral period for the state.

FIG. 2 represents modeling without consideration of a patch installation rate. FIG. 3 represents modeling with consideration of a patch installation rate. The model of FIG. 3 captures both vulnerability data as well as patching strategies. In addition to the simple model for vulnerability lifecycle of FIG. 2, the model of FIG. 3 includes information about how and when patches are installed (patching installation rates). The inputs to the model then also include the transition rates at which patches are installed.

There are multiple potential sources of data that may be used to parametrize the model. Time-to-weaponize may be from a study or third party. Each state represents a different time in the exploitation, so timing of the exploitation is included in the Markov chain (see β). Additional sources of information might include threat intelligence provided by private companies such as Mandiant or ExploitDB (Rapid7). Other existing sources that may potentially reveal how vulnerabilities evolve over time depending on different CVSS levels may be used.

In act 14 of FIG. 1, the state information for a particular combination (pairing) of an asset and a vulnerability is determined. As discussed below for FIG. 7, separate determination is made for different pairs of assets and vulnerabilities. If a particular asset has multiple vulnerabilities, then separate determinations of the model parameter values are performed for each asset-vulnerability pair. Where the same input values are provided, then one pair may be used as the model and determination for another pair.

The state information is determined as values of parameters of the Markov chain model. The current state of the asset and vulnerability is determined. Future states may also be predicted, including times of transition between the states. For example, a pair is modeled as being in state 2 at a current time, but as transitioning to state 3 after four days. The state information over a range of times may be determined, such as determining the current state and determining predictions of times at which the other states will occur for the pair. The Markov chain model is parameterized, providing state and time information for the pair.

The determination may be probabilistic. For example, the current state may be selected as a state with a highest probability where non-zero probability is provided for two or more (e.g., all) of the states. Similarly, the transition time may be probabilistic, such as providing a distribution of times of transition. The most likely time may be selected. Any combination of absolute values or probabilistic distributions may be used for any parameter of the Markov chain model. In the examples of FIGS. 2 and 3, the time to transition is a mean time to transition to the next state of exploitation.

Figure 4:
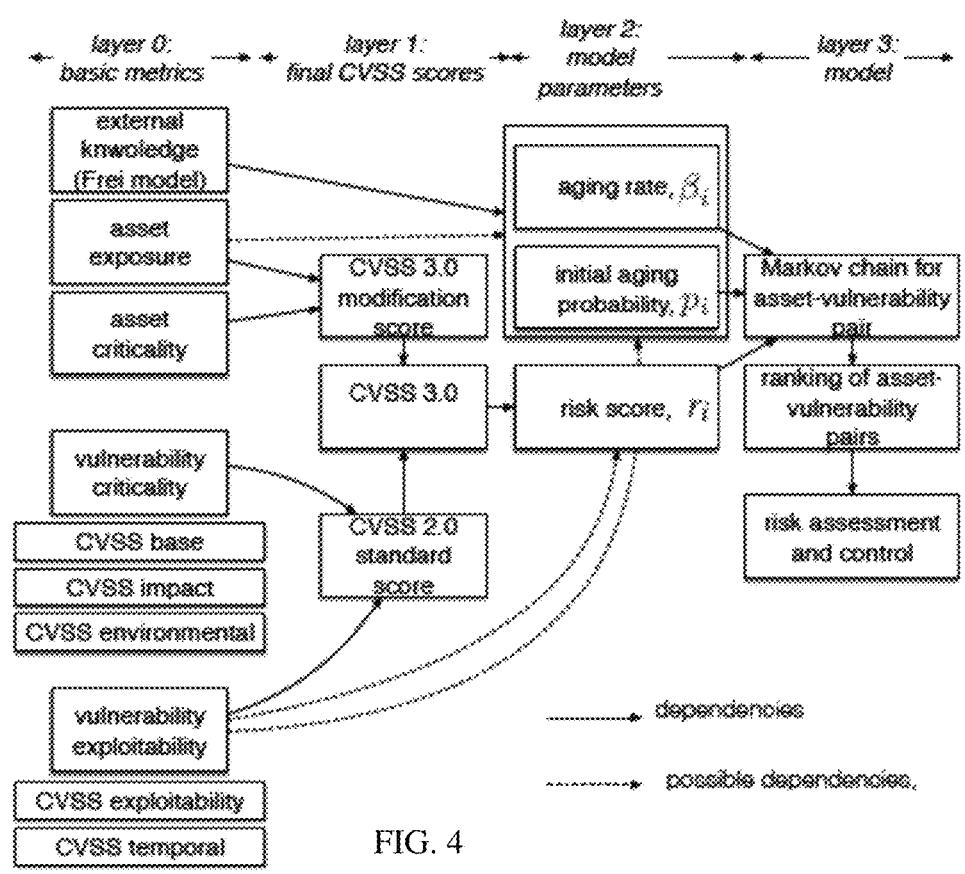
FIG. 4 illustrates one embodiment of patch management of industrial control systems using Markov chains.

FIG. 4 shows an example representation of the parameterization of the Markov chain model of vulnerability exploitation. The parameterization is divided into four layers (left to right in FIG. 4), but may be divided into more or fewer layers.

Layer 0 corresponds to basic metrics obtained from CVSS score inputs (vulnerability criticality and/or exploitability scores). Other acquired information may be included, such as external knowledge (e.g., average time to disclosure, average time to weaponization, average time to patch, and/or other statistical information about the asset, vulnerability, or patching. The asset exposure and/or asset criticality information may be acquired. Additional, different, or less information may be acquired.

Layer 1 corresponds to final CVSS scores. For example, the vulnerability criticality and/or exploitability information are combined into a CVSS 2.0 standard score. Other scores may be used. For the asset, a CVSS 3.0 modification score is calculated. Other approaches for weighting based on the criticality and/or exposure of the asset may be used. The modification score and standard score are combined to provide the CVSS 3.0 score. Any other qualitative or quantitative risk metric may be used. This score represents the vulnerability for the asset as weighted by or with consideration for the asset exposure and/or criticality. Other scoring and/or combinations of information may be used. One or more of the scores are calculated by the server or may be provided as an input with or without also providing the layer 0 basic metrics used to derive the scores.

For layer 2, the model parameters specific to the Markov chain model are calculated. Using the scoring from layer 1 with or without further information (e.g., statistical information about vulnerabilities and/or assets) from layers 0 or 1, the state at a given time and predicted timing for transition to other states are determined based on the risk. For example, the aging rate, $ß_i$, an initial aging probability, $p_i$, and risk score, $r_i$, are obtained from the CVSS final scores, as well as external knowledge. The aging rate indicates when transition between states occurs or rate to reach exploited or weaponized. The initial aging probability indicates the probability of being in each state at a given time. The risk scores are a reward for each state in the Markov chain. The risk score distribution across the states is calculated as a cost of the Markov chain.

Any formula or solution may be used to calculate the aging rate, aging probability, and/or risk scores for each state. FIG. 4 shows some connections of values as solid lines and others as dashed lines. The solid lines show one embodiment of information in calculation of the layer 2 model parameters. The dashed lines represent additional or alternative information used in the calculations. Other connections of type of information to calculation of model parameters may be used.

For the risk score or cost, one approach uses the CVSS or other vulnerability scores with or without asset exposure and/or criticality weighting. The value of the risk score at state 1 is set assuming that all temporal CVSS scores are favorable, and the value at state 4 is set assuming the worst case temporal scores. A linear interpolation yields intermediary risk costs. In another example for calculating the risk scores, the risk incurred in the state may be the state number (e.g., 1-3) or other assignment of risk.

The determination may calculate the aging rate of the vulnerability and the aging probability. The aging rate and probabilities are calculated based on an average time to disclosure. The average time to disclosure indicates an expected exploitation time or the times at which the exploitation of a vulnerability is expected to transition to another state. In one embodiment, these aging parameters ($ß_i$ and $p_i$) are set based on the distribution of the time between vulnerability disclosure and weaponization. Note that given the cumulative distribution function between vulnerability disclosure and weaponization (e.g., as inferred by statistical analysis of past vulnerabilities), ßi and pi are inferred. Any distribution may be approximated by a phase-type distribution. For example, the Markov-chain with rewards characterizes how the risk associated to a vulnerability evolves over time, since discovery up to weaponization. One solution involves two ingredients: 1) the generating matrix of the Markov chain, Q, and 2) a vector of immediate risk scores associated to each state of the Markov chain, r. Let $\pi_i(t)$ be the probability of finding the system at state i by time t. Let $\pi$ be the vector of state probabilities, $\pi=(\pi_1, \ldots, \pi_S)$. Then, $\pi$ is given by $\pi(t)=\exp(-Qt)$ and the expected risk at time t is r(t), $r(t)=\Sigma_{i=0}^{S}\pi_i(t)r_i$. Q is parameterized using historical data about the lifecycle of vulnerabilities and r using CVSS data or other score data.

In another embodiment, the aging rate is the average or expected exploitation time. The transient probabilities p1, p2 and p3 are related to the CVSS score of the vulnerability being patched. In one approach, the transient probabilities are set based on the vulnerability CVSS score and the associated asset exposure. The probabilities are relative between the number of states adopted. For example, the vulnerability CVSS score and asset exposure are normalized to the number of states (e.g., 3 states for low, medium, and high). High risk vulnerabilities are assigned high numeric risk number (high CVSS) and low risk vulnerabilities are assigned a low numeric risk number.

Other parameters of the Markov chain model may be calculated or used. The time delay, $\delta$, for patch installation as a function of state may be calculated. This value uses historical data to indicate when an operator of an asset typically patches relative to each state. The time required for patch installation, $\tau$, may be based on statistical information. The time delay for patch deferral decisions, $\gamma$, may be based on statistical information.

The values of the parameters indicate a state at a given time for an asset-vulnerability pair and times of transition to subsequent states. The Markov chain for the asset-vulnerability pair provides information about the current state, state at a given time, and/or time to transition to another state of high risk of exploitation. The risk for each state of the asset-vulnerability pair is also indicated. These values of the model parameters are determined using the asset exposure, asset criticality, or both of the industrial control system. Other inputs may be used in the model. For example, the time from vulnerability disclosure to exploit availability, any possible privileged input about the vulnerability at hand (e.g., classified incident reports about vulnerabilities), and/or any vulnerability exploitation data (threat intelligence internal and/or external).

Other information may be calculated from the values of the model parameters. For example, a patch risk metric is a sum of the transient probability of finding the patch in one of the states of the Markov chain times the risk incurred in that state. This information may be provided for determining importance of patching and by what time.

With a given vulnerability exploitation model for an asset-vulnerability pair, the state for the current time may be determined. The same model may be used to determine the state for a later time. For example, a user slides a time marker or inputs a future date. The state of the asset vulnerability pair at the user selected time, the corresponding risk, and/or the time until transition to a next state of exploitation are calculated and output.

In act 16 of FIG. 1, an interface or server transmits one or more values of the model parameters or information derived from the model. The transmission is internal, such as to a memory. Alternatively or additionally, the transmission is external, such as to a display or over a network.

Any of the values for the model, values used as inputs to the model, and/or values calculated from the model may be transmitted. In one embodiment, a graphical or visual representation of the model including the current state, time to reach other states, and/or the risks for each state are output. For example, the Markov chain model and any desired values are output. The probabilities, risks, and predicated times for each state of exploitation or for particular states may be transmitted. Any format may be provided for transmitting the state for a given time and the predicted time to transition to the next state for the industrial control system, such as a table, alphanumeric text, graphic, or video.

The output may be relative to a threshold risk of exploitation of the vulnerability. For example, an operator of the industrial control system indicates a threshold level of risk. This threshold may be used as a trigger to require patching or for any other purpose. The time to reach or the time at which the threshold should be reached is output. Based on the user defined risk tolerance, a period during which patching needs to occur is identified.

In another embodiment, a schedule to install a patch is transmitted. For example, the period before passing a threshold level of risk provides a schedule. The patch is scheduled for a time before the threshold level is reached. As another example, the operator of the asset or industrial control system inputs various planned asset and/or industrial control system downtimes. Based on the risk and state transition timing, the patching may be scheduled in one of the downtimes.

Figure 5:
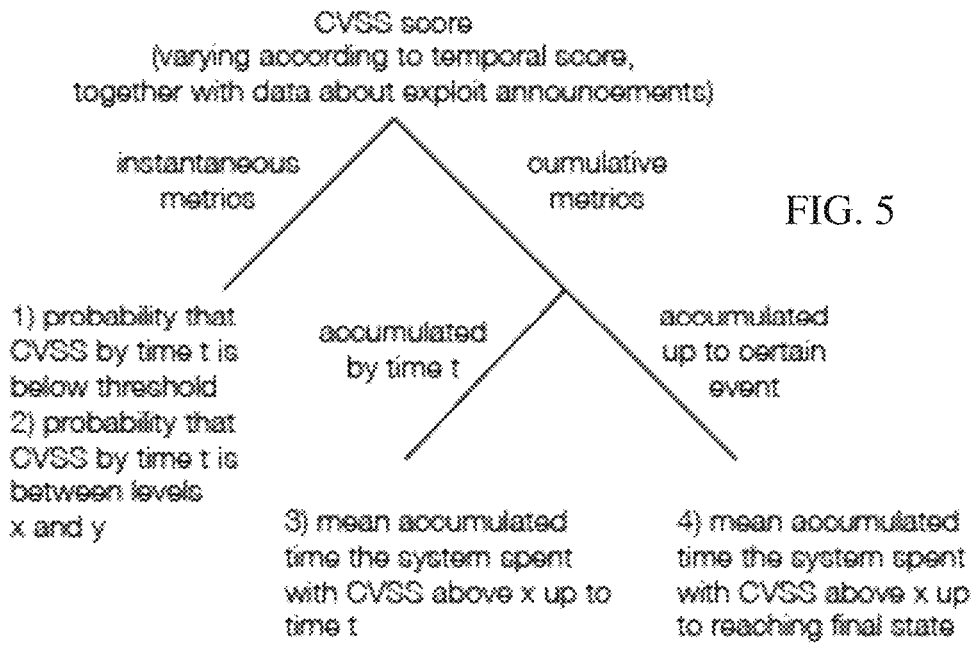
FIG. 5 shows example outputs determined from a Markov chain model.
Figure 6:
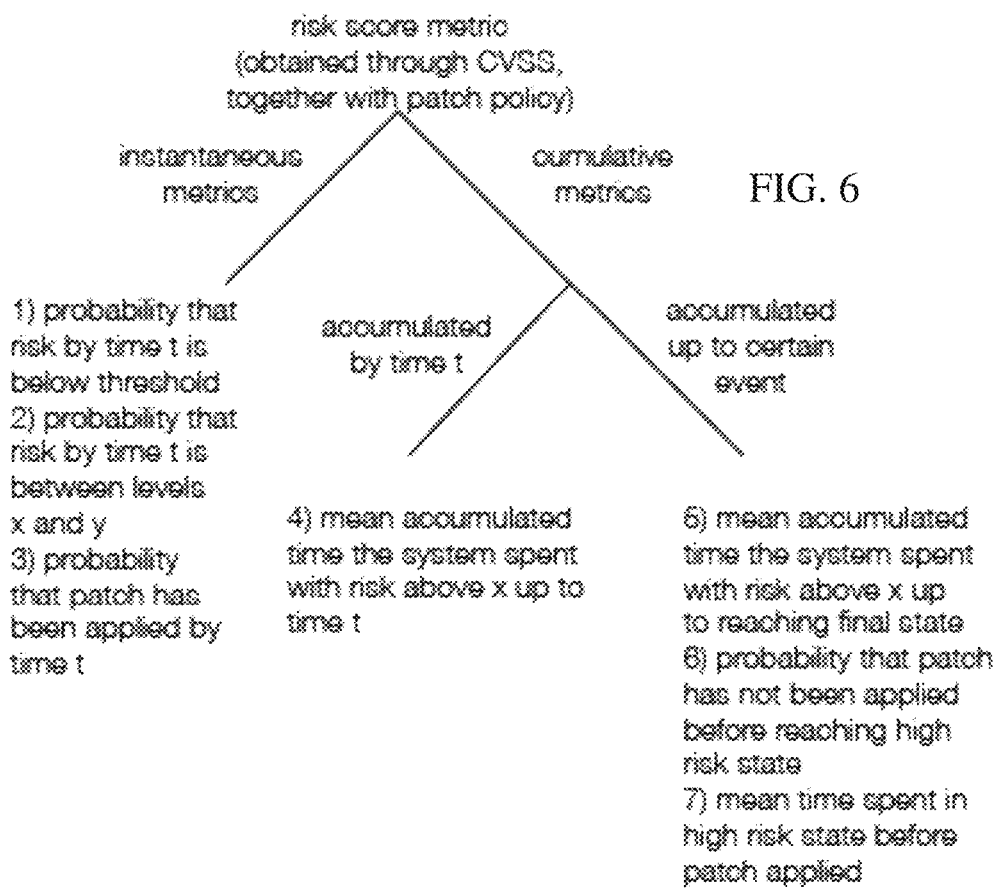
FIG. 6 shows other example outputs determined from a Markov chain model using time-to-patch information.

Various types of information may be useful to the operator of the industrial control system. FIG. 5 shows some example outputs based on the temporal CVSS score (e.g., exploit code maturity) modeled as the states in the model. The output may be a probability that the CVSS score by a particular time is below or above a threshold. The output may be a probability that the CVSS score by the particular time is between threshold levels. Other instantaneous metrics may be provided. Cumulative metrics may be transmitted, such as the mean accumulated time the system spent or is predicted to spend above a threshold CVSS score up to a given time. Another accumulation is up to a certain event. The mean accumulated time the asset spent or is predicted to spend with the CVSS score (i.e., state) above a given level until reaching a given state is transmitted. Other cumulative metrics may be provided.

In one embodiment, the information output includes information from the patching history of an operator of the industrial control system. Where the average time to patch is used in the modeling, then an additional instantaneous metric may be the probability that the patch has been or will be applied by a given time. Probabilities for risk may be output. For cumulative metrics, the mean accumulated time the asset spent or is predicted to spend with risk above a level until a given time, mean accumulated time with risk above a level until reaching a given state, the probability that a patch has not been applied before reaching a given state, and/or a mean time spent in a given risk state before a patch is applied may be transmitted.

The predicted or actual time spent in a given risk (e.g., highest risk) before a patch is applied may help the operator better understand the risk being taken by failure to patch. The model information may allow a more informed choice between patching and manufacturing downtime.

Figure 7:
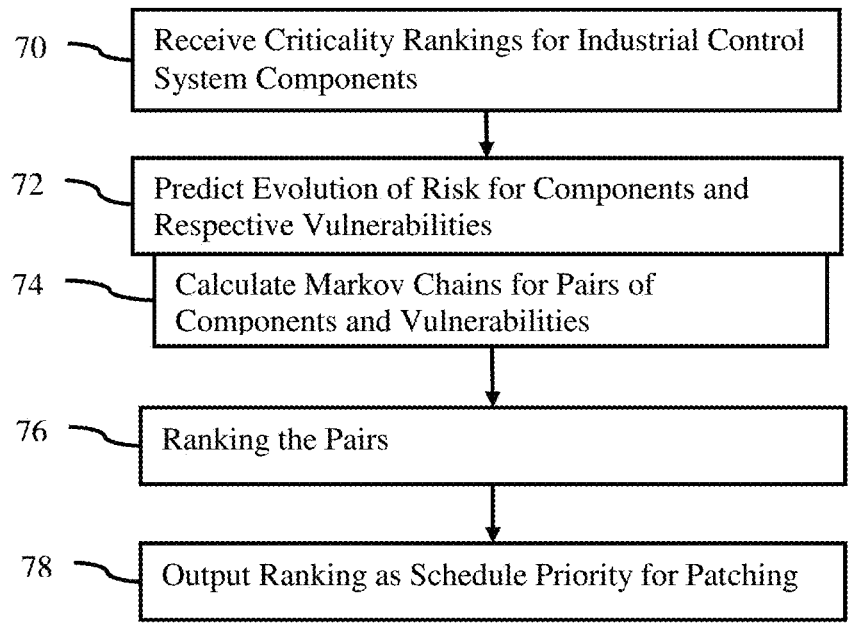
FIG. 7 is a flow chart diagram of an embodiment of a method for patch management of industrial control systems with prioritization.

FIG. 7 shows a further method for patch management of industrial control systems. This further method considers assets with multiple pending patches and/or industrial control systems with multiple assets having pending patches. Each asset is associated with a list of pending patches that are mapped after a vulnerability scan. A matrix indicates which patch is applicable to which asset and/or which asset has pending patches. FIG. 1 is directed to modeling for a given pair of assent and vulnerability. Using the matrix or other mapping, FIG. 7 is directed to handling multiple asset-vulnerability pairs. Based on the criticality and exposure of each pair, a Markov chain dictates how the overall risk will vary over time. Separate Markov chain models may be used for each pair. An overall risk for a given asset, groups of assets, and/or the entire industrial control system may be calculated from the determined parameters for each pair, such as an average or cumulative risk value. Alternatively or additionally, a framework to rank asset-vulnerability pairs based on dynamic and predictive models is provided. As shown in FIG. 4, multiple vulnerabilities are considered in parallel, and the patches are ranked to identify patches for more immediate application. The ranking provides the operator with information about risk and predicted change in risk that can be used to prioritize or schedule downtime and patching.

The method of FIG. 7 is performed by the system of FIG. 8 or a different system. For example, an interface 86 receives criticality ranking for the assets, exposure information for the assets, vulnerability scoring, and/or other information. A memory 88 may have some information, such as statistics on vulnerability aging or exploitation timing (e.g., average time to weaponized and/or average time to disclosure). A server 85 predicts evolution of risk for the pairs, calculates the Markov chains for the pairs, ranks the pairs by risk and/or timing, and/or outputs the ranking for scheduling priority. The interface 86 may output the ranking so an operator of the industrial control system 80 may schedule patching with downtime and/or schedule downtime to patch.

The acts are performed in the order shown or other orders. For example, acts 72 and 74 are performed together. By calculating the Markov chains for different pairs, the evolution of risk and/or exploitability is predicted.

Additional, different, or fewer acts may be provided. For example, act 78 is not provided. As another example, acts 72 and 74 are combined into one act. In yet another example, act 70 is not provided, but instead the information is accessed from a memory.

In act 70, the interface and/or server receive the information used for modeling. The asset criticality, asset exposure, vulnerability criticality, and/or vulnerability exploitability information is received. For example, an operator of the asset provides a network topology from which asset exposure is derived and/or provides a measure of asset exposure. As another example, the operator of the asset provides an indication of the criticality of the asset to the industrial process, such as providing a ranking and/or measure of financial loss associated with downtime of that asset. Any ranking of the importance of the asset to the industrial control system is received from the operator of the industrial control system or derived from information received from the operator. For the vulnerability, CVSS or other scores or the information used to derive the scores are received.

The information used for modeling is received for each asset for which there is at least one pending vulnerability. Alternatively, the asset information is received for all of the assets as part of configuration of the system. This information is then used as needed once vulnerabilities are discovered. The vulnerability information is provided upon discovery and/or upon request once the modeling is to be performed.

In act 72, the server, control system computer, or other processor predicts evolutions of risk to the devices over time due to vulnerabilities. The prediction is performed for each pair. The risk is treated as a state, such as different states of exploitability of the vulnerability. By calculating a Markov chain in act 74 for the pairings, one or more times to move between states of increasing risk are provided.

The prediction uses the criticality ranking of the asset to affect the risk. For a given state of exploitation, the risk is higher for a more critical asset than for a less critical asset given a same vulnerability. The predicted time to transition to the next state may be the same, or may be adjusted based on asset criticality.

The prediction uses other information, such as the exposure rankings, vulnerability criticality, and/or vulnerability exploitability. By calculating values for model parameters for each pairing, a risk for each state and a time of transition between states is provided. The values may be probabilistic or absolute. For a given time, probabilities for the states may be provided, such as providing a distribution of the likelihood of the pairing being in any of the modeled states at the given time.

For each pairing, a vulnerability lifecycle from disclosure to weaponization or over another range is predicted. The timing and the risk for the states of this vulnerability are provided. Other lifecycles may be used.

In act 76, the server, control system computer, or other processor ranks the pairings. As represented in FIG. 4 at layer 3, the asset-vulnerability pairs are ranked. The ranking is from most important to be patched to least important to be patched. The modeling for the different pairings yields information that may be used for ranking the pairings.

Any criterion or criteria may be used for the ranking. The risk at a given time, such as the current time, may be used. Since the vulnerability is treated as states, the time to move between states may be used in the ranking. A high level of risk and/or a high state of exploitability is to be avoided, so the ranking indicates which pairings are at an undesired state or are more likely to transition into the undesired risk level and/or state earlier than others. Other combinations may be provided, such as ranking by just the risk level or ranking using a combination of risk level and time of transition.

In act 78, the interface, server, control processor, or other processor outputs the ranking. The ranking provides a prioritization for patching vulnerabilities. The output is to the operator of the industrial control system. This ranking is used to schedule patching. For example, a planned downtime may allow for only patching a certain number of vulnerabilities. The highest ranked vulnerabilities are scheduled for patching. Alternatively, information in addition to or different than the ranking may be used, such as timing of transition to another state, current state, and/or risk level being used to inform the scheduling. The ranking may indicate one or more vulnerabilities to patch as soon as possible or before any planned downtime.

The output information provides various information to assess risk to the industrial control system. The impact of patch deferral is indicated by the changing risk over time. The vulnerability exploitability and age affect the attack probability, which can result in industrial control system unavailability or inoperability. Availability is particularly critical when dealing with firmware of PLC devices. The action of deferring or not patching may be used as a control variable in further modeling, such as using a Bayesian network. This control variable affects risk, costs and system availability.

FIG. 8 shows one embodiment of a system for patch management of industrial control systems. The system deals with challenges regarding information exchange for patch management. Privacy is one of the key challenges, particularly where information about an industrial control system is concerned. Models that generate results without disclosing vulnerability details may help foster information exchange between industrial plants and government or patch service providers in an efficient and secure way. By sharing model parameters rather than details about the plant production system and unpatched vulnerabilities, stakeholders may comply with compliance requirements (e.g. NERC CIP) while benefiting from an improved patching process. Plant managers may disclose, for instance, patch application rates to the government or other entity, which in turn may inform plant managers about metrics such as the mean time from vulnerability discovery to exploit availability. Plant managers and government agencies or other entities provide local and global information, respectively, about vulnerabilities. As a result of the exchange of information, better policies may be devised.

The system implements the method of FIG. 1, FIG. 7, or other method. The models of FIGS. 2-4 or other models may be used.

The industrial control system 80 is operated by a manufacturer or other entity. The patch management server 85 is operated by a government agency, a control system manufacturer, provider of the industrial control system 80, or a third party. Additional, different, or fewer components may be provided. For example, additional industrial control systems connect with the interface 86. As another example, more than one interface 86 and/or additional patch management servers 85 are provided. Any network may be used to communicate between the industrial control system 80 and the patch management server 85.

The industrial control system 80 is a collection of computational devices for controlling processes or tasks in manufacturing of products, such as chemical, mechanical, electrical, or other products. Any industrial setting for producing material or energy may use the industrial control system 80.

The industrial control system 80 includes one or more networks of various devices for controlling the manufacture. In the example of FIG. 8, the industrial control system 80 includes a programmable logic controller 81, a supervisory control and data acquisition system 82, and a human-machine interface 83. Any numbers of any of these devices may be provided. Other types of control devices may be provided, such as a logic unit, field panel, RTU, actuator controller, sensor controller, and/or monitoring workstation. Different devices may operate in isolation or independently of other devices. Other devices may intercommunicate for operation. Each device is a single device, but may be a collection of multiple devices in a distributed control system.

The components of the industrial control system 80 are configured by software, firmware, and/or hardware. The software or firmware may have one or more vulnerabilities. The vulnerabilities may be corrected by patching the software or firmware.

For patching, information about the industrial control system 80 may be provided to the patch management server 85. The SCADA 82, other computer of the industrial control system 80, or an operator's computer not connected to the industrial control system 80 provides information to the patch management server 85. The information may be availability of patches applicable to components of the industrial control system 80, asset criticality information, and/or asset exposure information. The asset information may provide rankings without specifically identifying detailed operation of the asset. An average time to patch may also be provided. The provided information may be generalized or altered so that confidential information about the industrial control system 80 is not communicated.

The patch management server 85 includes an interface 86, processor 87, and memory 88. Additional, different, or fewer components of the server 85 may be provided. For example, sensors connectable to the server 85 may be provided, where the sensors (e.g., data collection boxes and/or software modules or applications of parts of the industrial control system(s)) at one or more industrial control systems or industries gather data used by the server, such as asset information.

In one embodiment, the server 85 is initially loaded with standard models (e.g., equations) that define how vulnerabilities' risk evolve over time. The server 85 may also be optionally connected to a source of updates for these models at a Security Operations Center (SOC). This SOC might, for instance, elevate the risk level of a given vulnerability (by elevating the probability of transitioning to higher risk states) based on threat intelligence available (e.g. the fact that a given vulnerability was actively used in an attack campaign) and provide that information back to the server 85 for updating the models.

The interface 86 connects with the industrial control system 80 for receiving asset information and providing risk, ranking, probability, state, and/or timing information. The interface 86 is a port or interface card for network, phone, modem, cable, or other communications. The interface 86 may be a wired or wireless transceiver. Ethernet, Bluetooth, Wi-Fi, TCP/IP, or other communications formats may be used to communicate information. The interface 86 is used to receive, transmit, load, or access information.

In one embodiment, the interface 86 is configured by communications protocols to receive topology information for the industrial control system 80, importance of devices (e.g., PLC 81, SCADA 82, and HMI 83) in the industrial control system 80, and/or scoring for any vulnerabilities of the device of the industrial control system 80. The interface 86 is configured by the communications protocols to communicate information that is a function of the parameterization of the risks to the industrial control system 80. For example, a prioritization of patching including priority for a patch for the vulnerability of a given device of the industrial control system is communicated. The patch itself may or may not also be communicated by the interface 86.

The memory 88 is a cache, buffer, RAM, removable media, hard drive, or other computer readable storage media. The memory 88 is controlled or formatted by the processor 87 or other processor. While shown as one memory 88, the memory 88 may be distributed, such as including memories for different processors or as being memories of different databases.

The memory 88 is configured to store data used by the processor 87. For example, the data of the layers of FIG. 4 are stored. The data used to determine the values of the parameters of the model, the values of the parameters, and/or any intermediate information are stored. The values are stored as a curve, as values for a function fit to readings, a table, or other format. Graphics for imaging the fit model may be stored.

In one embodiment, the memory 88 stores instructions for programming the processor 87. The instructions for implementing the processes, methods, and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The processor 87 is a processor or multiple processors. The processor 87 is configured to use data from the interface 86 and/or the memory 88 to parameterize the model or models, providing risk and/or timing information. The processor 87 and corresponding server 85 are configured to parameterize risks to an attack in different states of vulnerability for any of the devices of the industrial control system 80. The risks are parameterized as a function of the topology information for the device, importance of the device, the scoring (e.g., CVSS scores), and/or an average time to weaponization or other average timing for the exploitation of a vulnerability. The processor 87 is configured to parameterize with a Markov chain of the states including predicted times to transition between the states and probabilities for the first device being in each of the states at a time. Any of the determination of values of the parameters of the state model discussed herein is performed by the processor 87.

A plant maintenance schedule may be combined with the patch priority information. The times in which each vulnerability will transition to higher risk states may be visualized in a patch evolution visualization. A real-time consolidated risk dashboard based on the actual probability of assets being exploited is presented. External threat intelligence (e.g. info about active attack campaigns) may be used as an input to change how the models behave at any time. The Markov chain may consider the user's patching behavior, presenting an option for global decisions based on statistical information collected from operators without disclosing details about the vulnerabilities.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for patch management of an industrial control system, the industrial control system operably connected to a plurality of assets, the method comprising:
    determining criticality rankings for each of the plurality of assets;
    acquiring a vulnerability information for each of the plurality of assets, the combination of the asset and its associated vulnerability information defining a pair;
    modeling a temporal evolution of the vulnerability information for each pair with a Markov chain, each temporal evolution including at least three states for the vulnerability and predicted times of transition between the states;
    acquiring a patch for at least one of the pairs;
    determining a current state and a time to transition to a subsequent state for each of the pairs;
    determining a risk level for each of the pairs, the risk level based on the current state and the criticality rankings for the pair; and
    comparing the risk level for each pair to a threshold risk level and the predicted time to transition to the subsequent state to define a time period during which patches must be installed, wherein acquiring comprises acquiring Common Vulnerability Scoring System information as the vulnerability information, and wherein modeling comprises modeling the temporal evolution of an exploit code maturity of the Common Vulnerability Scoring System information, the at least three states being proof-of-concept, functional, and high of the exploit code maturity.

2. The method of claim 1 wherein acquiring comprises acquiring the vulnerability information for a programmable logic controller, a remote terminal unit, a supervisory control and acquisition system, or a human-machine interface system for a manufacturing process.

3. The method of claim 1 wherein acquiring further comprises acquiring a time from disclosure of the vulnerability and information about exploitation of the vulnerability.

4. The method of claim 1 wherein transmitting comprises transmitting the first state as a current state and the first predicted time as a time to reach a threshold risk of exploitation of the vulnerability.

5. The method of claim 1 wherein transmitting comprise transmitting probabilities for the at least three states and probabilities for the predicted times.

6. The method of claim 1 wherein determining comprises calculating an aging rate of the vulnerability and an aging probability from an average time to disclosure, and calculating a risk score distribution across the at least three states as a cost of the Markov chain.

7. The method of claim 1 wherein transmitting further comprises transmitting a schedule to install the patch on the industrial control system based on the first predicted time.

8. The method of claim 1 wherein determining comprises determining as a function of asset exposure, asset criticality, or both of the industrial control system.

9. The method of claim 1 wherein acquiring further comprises acquiring a patch installation rate, wherein modeling comprises modeling as a function of the patch installation rate, and wherein transmitting further comprises transmitting a predicted time in a highest risk of the at least three states before the patch is applied.

10. The method of claim 1 wherein transmitting comprises transmitting the first state and the first predicted time in a visual representation of the Markov chain.

11. The method of claim 1 wherein determining comprises determining for a current time and further comprising repeating the determining for a user selected time.

* * * * *